United States Patent
Perman et al.

(10) Patent No.: US 6,492,183 B1
(45) Date of Patent: Dec. 10, 2002

(54) EXTRACTION ARTICLES AND METHODS

(75) Inventors: Craig A. Perman, Woodbury, MN (US); Taib K. Ansera, St. Paul, MN (US); Eric E. Wisted, Apple Valley, MN (US); Michael R. Berrigan, Oakdale, MN (US); Jason R. Jacobson, Cottage Cove, MN (US); Glen H. Bayer, Jr., Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/787,133
(22) PCT Filed: Sep. 13, 1999
(86) PCT No.: PCT/US99/21113
§ 371 (c)(1),
(2), (4) Date: Mar. 13, 2001
(87) PCT Pub. No.: WO00/15331
PCT Pub. Date: Mar. 23, 2000

Related U.S. Application Data
(60) Provisional application No. 60/100,242, filed on Sep. 14, 1998.

(51) Int. Cl.[7] ................................. G01N 1/18
(52) U.S. Cl. ................. 436/178; 73/863.23; 210/490; 210/496; 210/500.36; 210/505; 422/101; 436/177; 156/73.5; 156/60
(58) Field of Search .......................... 210/198.2, 198.3, 210/263, 455, 490, 496, 500.36, 502.1, 503, 505, 508, 656, 660; 156/73.1, 73.3, 73.4; 422/101; 436/177, 178; 73/863.23

(56) References Cited

U.S. PATENT DOCUMENTS

| | | | |
|---|---|---|---|
| 2,464,301 A | 3/1949 | Francis, Jr. | |
| 2,612,679 A | 10/1952 | Ladisch | |
| 3,073,735 A | 1/1963 | Till et al. | |
| 3,764,527 A | 10/1973 | Sohl | |
| 4,052,306 A | 10/1977 | Schwartz et al. | |
| 4,103,058 A | 7/1978 | Humlicek | |
| 4,153,661 A | 5/1979 | Ree et al. | |
| 4,373,519 A | 2/1983 | Errede et al. | |
| 4,460,642 A | 7/1984 | Errede et al. | |
| 4,565,663 A | 1/1986 | Errede et al. | |
| 4,810,381 A | 3/1989 | Hagen et al. | |
| 4,906,378 A | 3/1990 | Hagen et al. | |
| 4,971,736 A | 11/1990 | Hagen et al. | |
| 5,071,610 A | 12/1991 | Hagen et al. | |
| 5,147,539 A | 9/1992 | Hagen et al. | |
| 5,207,915 A | 5/1993 | Hagen et al. | |
| 5,215,609 A | * 6/1993 | Sanders | 156/73.1 |
| 5,238,621 A | 8/1993 | Hagen et al. | |
| 5,279,742 A | 1/1994 | Markell et al. | |
| 5,391,298 A | 2/1995 | Pieper et al. | |
| 5,639,700 A | * 6/1997 | Braun et al. | |
| 5,849,249 A | 12/1998 | Jones, Jr. et al. | |
| 5,980,616 A | * 11/1999 | Johnson et al. | 210/502.1 |

FOREIGN PATENT DOCUMENTS

EP        0 498 557 A1    8/1992

OTHER PUBLICATIONS

Wente, Van A., "Superfine Thermoplastic Fibers", *Industrial Engineering Chemistry*, 342, vol. 48, pp. 1342 et seq. (1956).

* cited by examiner

*Primary Examiner*—Joseph W. Drodge
(74) *Attorney, Agent, or Firm*—Christopher D. Gram; William J. Bond; Robert W. Sprague (57) ABSTRACT

This invention provides a one-piece multilayer article for use in solid phase extraction that includes at least two porous support layers and a solid phase extraction medium, wherein the porous support layers are thermo-mechanically attached at at least one thermo-mechanical attachment site. At least one of the porous support layers can be a prefilter layer.

38 Claims, 2 Drawing Sheets

EXTRACTION ARTICLES AND METHODS

This application is a 371 of PCT/US99/21113 filed on Sep. 13, 1999, which claims benefit of U.S. provisional application 60/100,242 filed on Sep. 14, 1998.

FIELD OF THE INVENTION

This invention relates to extraction articles, particularly to a one-piece multilayer article for use in solid phase extraction in isolation, separation, and analysis techniques. The invention also relates to methods of separation and analysis using the articles, as well as to methods of making the one-piece multilayer article.

BACKGROUND OF THE INVENTION

Generally, the art of separation science, which involves extraction and chromatography, has two main objectives. One is high yield extraction and recovery of a targeted analyte and the other is a rapid rate of extraction and elution. A specific type of extraction used for separation is solid phase extraction, also known as SPE. SPE is a method of sample preparation that removes and concentrates an analyte from a liquid sample by absorption or adsorption onto a disposable solid phase medium. This is followed by elution of the analyte with a solvent appropriate for analysis. In SPE two devices commercialized to balance the two competing objectives described above are cartridges (such as those available under the trade designation BAKERBOND SPEEDISK from J. T. Baker, Phillipsburg, N.J.) and disks (such as those available under the trade designation DFP disks from Whatman, inc., Clifton, N.J.).

Solid phase extraction cartridges typically consist of a column of loose sorbent material as the extraction medium. This sorbent material has a sufficient surface area to reduce the problems of sample processing using gravity or vacuum. This design has certain inherent disadvantages. For example, such cartridges may typically have a small cross-sectional area of extraction media, which results in slow processing, as well as channeling, which reduces analyte retention. Solid phase extraction disks eliminate these disadvantages.

Commercial solid phase extraction disks include particle loaded membranes of various diameters as the extraction medium. For example, one such disk comprises a membrane that includes sorbent particles (e.g., C8- and C18-bonded silica particles) immobilized in a web of poly(tetrafluoroethylene) (PTFE) microfibrils. Another such disk includes a web of glass microfibers impregnated with chemically bonded silica sorbents such as C18 aliphatics. For general use, SPE disks can be supported on a glass or polymer frit disk in a standard filtration apparatus, using vacuum to generate the desired flow of sample through the disk.

Most commercial SPE products are designed to be used with a separate prefilter if the sample of interest (e.g., wastewater) contains a significant amount of solid material (e.g., suspended solids) that could plug the SPE medium. Commercial prefilters are typically constructed of natural fibers such as celluloses. glass fibers, or synthetic thermoplastic fibers such as polypropylene, polyester, and polyethyleneterephthalate. Typically, these prefilters are designed to prevent the SPE medium from becoming plugged. The prefilters are typically supplied separately from the SPE products.

SPE products are still needed that are capable of achieving high recoveries of analytes from a liquid sample while maintaining high sample flow-rates with little or no plugging of the disk during use. The latter problem can hinder effective analysis. This is particularly true for the extraction of nonpolar hydrocarbon extractable analytes from water. Ease of use and simplicity in procedure are also important considerations for the end user. Other factors the user may consider in choosing extraction media include the capability of being used with a variety of equipment and glassware including automatic analysis apparatus. The present invention provides an extraction disk that has one or more of these characteristics.

SUMMARY OF THE INVENTION

This invention provides a one-piece multilayer article for use in extraction, isolation, separation, and analysis techniques. In one aspect, the invention provides an article that includes a first porous support layer thermo-mechanically attached to a second porous support layer (preferably, welded together) at at least one attachment site, and therebetween, a solid phase extraction medium comprising a fluoropolymer (preferably, in the form of a membrane) is disposed. Preferably, at least one of the porous support layers is made from thermoplastic material.

Although the extraction articles specifically described herein include three layers, more than three layers can be incorporated into the articles if desired as long as at least one each of the three layers (first porous support layer, second porous support layer, and SPE medium) described herein are present. The multilayer articles specifically described herein may come in a variety of shapes and forms including circular disks, squares, ovals, etc.

The fluoropolymer solid phase extraction (SPE) medium can be in a variety of forms, such as fibers, particulate material, a membrane, other porous material having a high surface area, or combinations thereof. Preferably, the SPE medium is in the form of a membrane that includes a fibril matrix and sorptive particles enmeshed therein. The fibril matrix is typically an open-structured entangled mass of microfibers. The sorptive particles typically form the active material. By "active" it is meant that the material is capable of capturing an analyte of interest and holding it either by adsorption or absorption. The fibril matrix itself may also form the active material, although typically it does not. Furthermore, the fibril matrix may also include inactive particles such as glass beads or other materials for enhanced flow rates.

The porous support layers can be made of a wide variety of porous materials that do not substantially hinder flow of the liquid of the sample of interest. Typically these materials are those that are capable of protecting the solid phase extraction medium from abrasion and wear during handling and use. The material should be sufficiently porous to allow the liquid sample to flow through it, and preferably, able to retain particles contained within the SPE medium. Preferably, the support layers are made of a nonwoven material. It is also preferred that both the first and second porous support layers are very similar in composition (as opposed to structure), and more preferably, they are the same.

In a preferred embodiment, one of the porous support layers is a prefilter layer, preferably made of a nonwoven material. (For ease of description, as used herein the first porous support layer will be designated as the preferred porous support layer that is a prefilter; however, either the first or second porous support layer can be a prefilter). More preferably, the first porous support layer is a nonwoven web of blown microfibers, most preferably melt blown microfibers. Such "melt blown microfibers" or "BMF" are discrete, fine, fibers prepared by extruding fluid, fiber-forming material through fine orifices in a die, directing the extruded material into a high-velocity gaseous stream to attenuate it, and then solidifying and collecting the mass of fibers. In preferred embodiments, the prefilter layer includes a nonwoven web of melt blown polyolefin fibers, particularly polypropylene fibers.

In embodiments where one of the porous support layers is a prefilter, it is preferred that the prefilter have the following characteristics: a solidity of no greater than about 20%; a thickness of at least about 0.5 millimeters (mm); and a basis weight of at least about 70 grams per square meter ($g/m^2$). As used herein, solidity refers to the amount of solid material in a given volume and is calculated by using the relationship between weight and thickness measurements of webs. That is, solidity equals the mass of a web divided by the polymer density divided by the volume of the web and is reported as a percentage of the volume. The thickness refers to the dimension of the prefilter through which the sample of interest flows and is reported in mm. The basis weight refers to mass of the material per unit area and is reported in $g/m^2$.

The one-piece multilayer extraction disks can be used in a wide variety of solid phase extraction processes to remove a broad spectrum of analytes from a wide variety of liquid samples (optionally containing particulate material). Preferably, both the solid phase extraction medium and the prefilter are chosen to remove the analyte of interest. That is, in certain preferred extraction procedures a prefilter is chosen such that it helps capture the targeted analyte, thereby increasing the recovery yield. In certain preferred embodiments, the article of the invention is designed to remove hydrocarbon extractables (e.g., nonpolar hydrocarbons such as oil and grease) from a liquid sample (e.g., water). One such embodiment includes a prefilter layer, a polytetrafluoroethylene (PTFE such as TEFLON) fibril matrix containing both C18 bonded silica particles and glass beads, and a support layer. The prefilter is a polyolefin (e.g., polypropylene or polyethylene) blown microfiber web, which can act both as a depth filter and as a medium to help capture the hydrocarbon extractables. This combination of a prefilter with the PTFE fibril matrix and C18 bonded silica particles results in high efficiency extractions. Although this prefilter design is not limited to hydrocarbon analysis, a synergistic effect results from the use of a prefilter that is capable of sorbing nonpolar hydrocarbon materials from water along with a C18 PTFE membrane. In other applications the action of the prefilter may only reside in its ability to function as a filter for suspended solids, for example, and not as an adjunct to the sorption capabilities of the solid phase extraction medium.

The present invention also provides methods of extracting an analyte from a sample using the one-piece multilayer solid phase extraction article as well as methods of preparing the article.

The method of making a one-piece multilayer extraction article of the present invention involves thermo-mechanically attaching the first porous support layer to the second porous support layer. In a preferred embodiment an ultrasonic welder is used to form the thermo-mechanical attachment site between the two support layers. Bound within the thermo-mechanical attachment site is the SPE medium. Preferably, the process of welding substantially simultaneously attaches the porous support layers together while capturing the SPE medium and cuts the article into a shape and dimension.

In a preferred embodiment, the present invention provides a method of ultrasonically welding a one-piece multilayer extraction article that comprises the steps of: a) stacking a first porous support layer, a second porous support layer, and a layer of solid phase extraction medium comprising a fluoropolymer therebetween, b) positioning the stack of layers in an ultrasonic welder that comprises an anvil and an ultrasonic horn; and c) pinching the stack of layers between the anvil and the horn to form a thermo-mechanical attachment site between the first and second porous support layers, and the solid phase extraction medium is bound within the thermo-mechanical attachment site.

DETAILED DESCRIPTION OF PREFERRED EMBODIMENTS

Figures 1, 2:
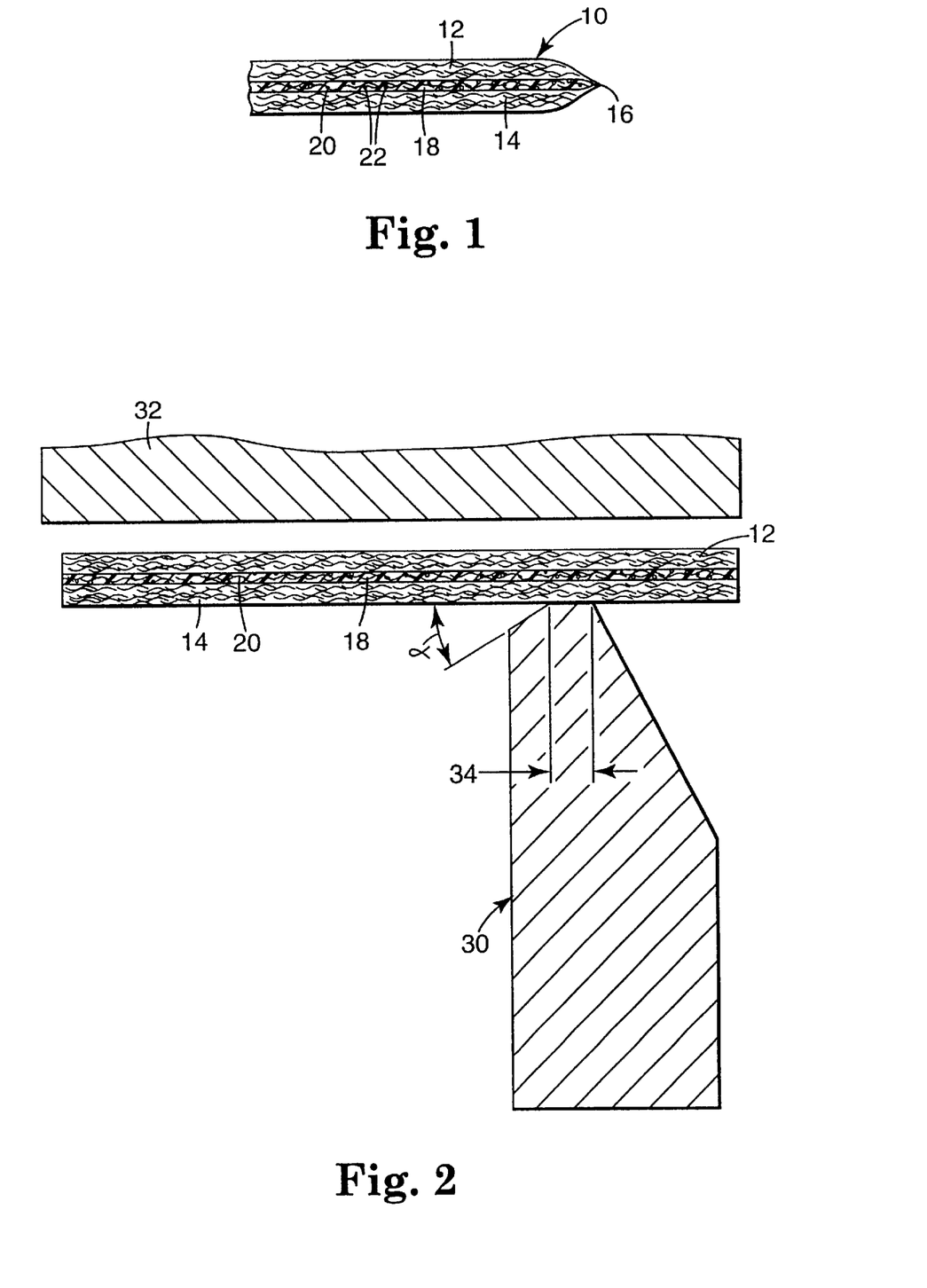
FIG. 1 is a cross-section of a one-piece multilayer extraction article of the present invention.
FIG. 2 is a cross-sectional view of a portion of an ultrasonic welding apparatus for making a one-piece multilayer extraction article, before welding.

Referring now to FIG. 1, the present invention provides a one-piece multilayer extraction article 10 that includes a first porous support layer 12 and a second porous support layer 14 thermo-mechanically attached at at least one attachment site, having a layer of a solid phase extraction medium 18 therebetween. The solid phase extraction medium comprises a fluoropolymer, and at least one of first porous support layer 12 and second porous support layer 14 is a thermoplastic material. Both first porous support layer 12 and second porous support layer 14 are in intimate contact with SPE medium 18. Preferably, the thermo-mechanical attachment site is located at the perimeter 16 of article 10. The solid phase extraction medium 18 preferably includes a fibril matrix 20 and sorptive particles 22 enmeshed therein. Optionally, but preferably, the fibril matrix 20 may also include inactive (i.e., nonsorptive) particles such as glass beads. The fibril matrix 20 is an open-structured entangled mass of microfibers. The sorptive particles 22 are capable of taking up an analyte of interest and holding it either by adsorption or absorption.

First porous support layer 12 can be made of a wide variety of porous materials. It is preferably a nonwoven web, and more preferably, a blown microfiber web. Preferably, the blown microfiber web includes polyolefin fibers, and more preferably polypropylene fibers, although other polymers can be used if desired.

In a preferred embodiment, the first porous support layer is a prefilter that removes particulate material, such as suspended solids, from a sample of interest, such as wastewater. The prefilter preferably reduces clogging of the solid phase extraction medium, which would otherwise increase extraction times. Preferably, and significantly, in certain embodiments, the prefilter also aids in capturing the analyte of interest, such as nonpolar hydrocarbon extractables, which enhances sorption capacity of the one-piece multilayer extraction disk. In this arrangement, the prefilter and the inner solid phase extraction medium are made of materials that have similar sorption characteristics for the analyte of interest. Alternatively, the prefilter can be used to capture contaminants that can interfere with the analysis of the desired analyte, which is collected by the inner solid phase extraction medium. In this arrangement, the prefilter and the inner solid phase extraction medium are made of materials that have differing sorption characteristics for the analyte of interest.

The second porous support layer 14 assists in supporting and reducing abrasion to the inner solid phase extraction medium while the disk is in use and during handling. The support layer 14 can include a wide variety of porous materials. Typically it is a nonwoven web, and preferably a microfiber web, more preferably a melt blown microfiber web. For more effective bonding by ultrasonic welding, it is preferred that the material of the first and second porous support layers include similar types of polymeric material. Preferably the support layers are the same polymeric material.

In a preferred embodiment of the invention, the two porous support layers 12 and layer 14 are sonically welded together to encase a solid phase extraction medium in between and form a one-piece integral unit. The two (or more) outer layers may alternatively be bonded together using a hot press. Preferably, either method can be used to cut and melt the edges together to form a single unit.

For preferred embodiments, the capability of creating an attachment site incorporating a low surface energy layer (e.g., PTFE) with higher surface energy thermoplastic layers (e.g., polypropylene) was unexpected. The presence of the low surface energy material was thought to prevent or inhibit effective bonding between the two (or more) outer layers.

Porous Support Layers

The one-piece multilayer SPE article of the invention comprises a first and second porous support layer. Optionally, one of the support layers can be a scrim, i.e. a thin porous support layer. As a scrim, the support layer provides support for the SPE medium and helps protect the SPE medium from potentially damaging abrasion during shipping and handling. This support and protection is achieved by intimately contacting the porous support layers with the SPE medium and by thermo-mechanically attaching the first and second support layers with the SPE medium disposed therebetween. Preferably, the thermo-mechanical attachment is located at an edge in the article. In a preferred embodiment where the article is in the form of a circular disk, the thermo-mechanical attachment is located at the perimeter of the disk, more preferably, around the total circumference of the disk. Preferably, at least a portion of the SPE medium is pinched or wedged between the two porous support layers to reduce distortion of the SPE medium while being handled.

The porous support layers may consist of any suitable material that does not unduly restrict the flow of water or other sample liquid through the web or in any way reduce the function of the SPE medium. The material for the two porous support layers should be chosen such that they are capable of being thermo-mechanically attached. Preferably, at least one of the porous support layers is a thermoplastic polymeric material. More preferably, both the first and second porous support layers comprise a similar type of thermoplastic polymeric material, and most preferably, the layers are the same thermoplastic polymeric material. Suitable thermoplastic polymeric materials include polycarbonates, polyesters, polyamides, and polyolefins such as polyethylene, polypropylene, ethylene/propylene copolymers, and blends thereof. Copolymers as used herein include random, block, grafted, etc. polymers prepared from two or more different types of monomers.

The thermoplastic polymeric material is preferably provided in the form of a fibrous web. Such fibrous material can be made of either spun bonded or spun laid fibers, blown microfibers, or the like. A melt blown microfiber (BMF) web is more preferred.

Preferably, at least one of the porous support layers is made of polypropylene with a basis weight of about 14 grams per square meter ($g/m^2$) to about 70 $g/m^2$, and more preferably, about 17 $g/m^2$ to about 34.0 $g/m^2$. The thickness is typically less than about 1 mm.

The porous support layers can be embossed if desired for enhanced strength. For example, heat embossing at points approximately 0.006 $cm^2$ area spaced approximately 1.25 mm on center can be instituted. The porous support layers should have sufficient porosity to allow unrestricted flow. Materials suitable for the support layers that are commercially available include a nonwoven web available from BBA Nonwovens of Simpsonville, S.C. under the product name CELESTRA.

In a preferred embodiment, one of the porous support layers is a prefilter. There are two basic types of mechanical filtration mechanisms—surface and depth filtration. Filtration occurs when the porosity of a filter medium allows the carrier fluid to pass through the pores of the medium itself while larger particles (dirt or suspended solids) are retained on the upstream surface of the filter medium. If the particles fail to pass through the tortuous path of the filter medium it then becomes lodged in the filter reducing the overall porosity for fluid flow.

Surface filtration works by direct interception of the particles reducing the effective pore size of the filter. A cake or layer of the particles builds on the surface, forming a filtration medium having increasingly smaller pore size until fluid flow eventually stops and the filter is considered plugged.

Depth filtration occurs when a significant amount of thickness or void volume (or dirt holding capacity) is provided by the filter medium such that a longer and more random path for fluid flow occurs. This creates more possibility for retention of particles as well as direct interception of these particles within the thickness of the filter material. A depth filter is more effective in reducing plugging because there is more depth loading of the particles (dirt) rather than surface interception and subsequent cake development. The carrier liquid is still able to find a path through the filtration medium. In a depth filter, generally, larger particles tend to become trapped first while the smaller particles pass deeper into the pores of the filter medium before lodging therein.

The prefilter support layer of the present invention can function as a depth filter. This makes them particularly suitable for evaluating environmental waters or biological samples containing suspended solids having widely distributed particle sizes.

To enhance the function of the prefilter support layer as a depth filter, various characteristics are balanced to avoid plugging and enhance filtration. These characteristics include solidity, thickness, basis weight, internal pore volume, fiber diameter, etc.

For example, smaller fiber diameter provides a larger surface area that is available for oil extraction. However, smaller diameter fibers form less dense webs and fibers can be more fragile. Larger diameter fibers provide greater strength and better shape retention. Preferably, the fibers of the prefilter support layer have a diameter of at least about 0.1 microns, more preferably 1.0 microns, and most preferably 7 microns. Preferably, the fiber diameter is no greater than about 20 microns, more preferably 15 microns, and most preferably 12 microns.

Preferably, the prefilter support layer has a solidity of no greater than about 20%, more preferably, no greater than about 15%, and most preferably, no greater than about 10%. Preferably, the solidity is at least about 5%. Preferably, the prefilter has a thickness of at least about 0.5 mm, more preferably, at least about 1 nm. and most preferably, at least about 2 mm. Preferably, the thickness is no greater than about 0.5 mm. Preferably, the prefilter has a basis weight of at least about 70 g/m$^2$, more preferably, at least about 100 g/m$^2$, and most preferably, at least about 200 g/m$^2$. Preferably, the basis weight is no greater than about 300 g/m$^2$.

These parameters contribute to the void volume of the prefilter. For example, a thickness of at least about 0.5 mm to maintain a high internal void volume. A high internal void volume allows for a large surface area and tortuous paths for the analyte to travel with little or no pressure drop.

A wide variety of fibrous materials can be used to make the prefilter support layer of the present invention. The choice of material used in making the prefilter can be matched, for example, by polarity, to the analyte being extracted if it is desired to enhance extraction. Alternatively, it can be matched to contaminants that can detrimentally affect the quantitative or qualitative evaluation of the analyte of interest. For example, for enhancing the separation and analysis of hexane extractables such as oil and grease, polyolefins such as polypropylene, polyethylene, polybutylene, halogenated derivatives thereof, and blends or copolymers thereof are suitable. Polypropylene is a particularly preferred material because it is easily processed. Other suitable materials include polycarbonates, polyesters, polystyrene, polyamide, and the like. Blends or copolymers of various materials can also be used.

The prefilter support layer can be made of spun bonded fibers, carded fibers, spun laid or spun laced fibers, blown microfibers, or the like. A blown microfiber (BMF) web is preferred. For making a BMF web, a resin having a melt flow index of about 43 to about 400 is particularly preferred. Commercially available examples of resins can be obtained from Fina Petroleum of Houston, Tex. A preferred polypropylene resin is available under the trade designation FINA 3860.

Microfiber webs are generally formed by melt blowing techniques such as described in Wente, Van A. Super Fine Thermoplastic Fibers, Industrial Engineering Chemistry, 342, Volume 48. page 1342 et seq (1956), as well as U.S. Pat. No. 2,464,301 (Francis), U.S. Pat. No. 2,612,679 (Ladisch), and U.S. Pat. No. 3,073,735 (Till et al.). Furthermore, specific examples of materials useful as prefilter layers include those described in U.S. Pat. No. 3,764,527 (Sohl), U.S. Pat. No. 4,052,306 (Schwartz et al.). and U.S. Pat. No. 4,103,058 (Humlicek). Briefly, a resin is heated above its melt temperature in either a single or twin screw extruder and fed through a die under high pressure. Fibers are formed at the exit of the die and blown onto a collector at such a speed as to produce a continuous web at a desired basis weight.

The basis weight of the web varies depending the rate at which the collector is moved through the gaseous stream. Examples of commercially available materials suitable for the prefilter support layer of the invention includes an oil sorbent polypropylene BMF web, available from 3M Co. of St. Paul, Minn. under the product designation OILSORB T-151 BMF.

Optionally, either the first or second porous support layers, or both, can comprise multiple layers of porous material, as long as at least one of the multiple layers of porous material is in intimate contact with the SPE medium.

Solid Phase Extraction Medium

The solid phase extraction medium can include a wide variety of materials in various forms. For example, it can be in the form of particles, which may be loose or immobilized, fibers, a membrane, or other porous material that have a high surface area. In a preferred embodiment, the SPE medium is a fibril matrix having sorbent particles enmeshed therein. Such sorbent particles are the "active" element of the medium in that they capture the analyte of interest.

The fibril matrix can include any of a wide variety of fibers. Suitable fibers include glass fibers, polyolefin fibers, particularly polypropylene and polyethylene microfibers, aramid fibers, polytetrafluoroethylene fibers, and natural cellulosic fibers. Mixtures of fibers can be used, which themselves may be active or inactive. The matrix forms a web that is preferably about 15 mm to about 40 mm thick.

The sorbent (active) particles are typically insoluble in an aqueous or organic liquid. They can be made of one material or a combination of materials as in a coated particle. They can be swellable or nonswellable, although they are preferably nonswellable in water and organic liquids. They are chosen for their affinity for the target analyte. Water swellable particles are described in U.S. Pat. No. 4,565,663 (Errede et al.); U.S. Pat. No. 4,460,642 (Errede et al.); and U.S. Pat. No. 4,373,519 (Errede et al.). Particles that are nonswellable in water are described in U.S. Pat. No. 4,810,381 (Hagen et al.); U.S. Pat. No. 4,906,378 Hagen et al; U.S. Pat. No. 4,971,736 (Hagen et al.); and U.S. Pat. No. 5,279,742 (Markell et al.). Mixtures of sorbent (active) particles can also be used.

In a preferred embodiment, coated particles can be enmeshed in the SPE medium. The base particles can include inorganic oxides such as silica, alumina, titania, zirconia, etc., to which are covalently bonded organic groups. For analysis of nonpolar hydrocarbon (e.g.,hexane) extractable compounds, for example, covalently bonded organic groups such as aliphatic groups of varying chain length (C2, C4, C8, or C18 groups) can be used. Preferred C18 bonded silica particles are available from Varian Sample Preparation Products, Harbor City, Calif.

Optionally, inactive particles or other materials or mixtures thereof, can be used in the solid phase extraction medium. Such materials include, for example, glass spheres and silica particles. Solid glass spheres are particularly preferred because they have high compressive strength and surface hardness. Thus, the solid phase extraction medium has a higher compressive strength and surface hardness when solid glass spheres are enmeshed within the fibril matrix. Solid glass spheres also allow for better stress distribution and liquid flow characteristics to the media when subjected to vacuum or pressure drop during extraction and elution. Suitable solid glass spheres can be obtained from Potters Industries Inc. of Parsippany, N.J. under the product name SPHERIGLASS or from 3M Co. (St Paul. Minn.) under the product name TUNGO Beads. They preferably range from about 52 microns (micrometers or $\mu$m) to 105 microns in particle size (i.e., the largest dimension, which is typically, the diameter), and have a mean volume particle size of about 70 microns. The particle size is determined by light scattering methodology.

Preferred embodiments of the SPE medium of the one-piece multilayer extraction disks of the present invention include both active and inactive particles. The active particles are preferably present in the SPE medium in an amount of about 3 weight percent (wt-%) to about 10 wt-%, based on the total weight of particles. The inactive particles are preferably present in the SPE medium in an amount of about 90 wt-% to about 97 wt-%, based on the total weight of the particles.

Examples of suitable SPE media are described in U.S. Pat. No. 5,279,742 (Markell et al.), U.S. Pat. No. 4,906,378 (Hagen et al.), U.S. Pat. No. 4,153,661 (Ree et al.), U.S. Pat. No. 5,071,610 (Hagen et al.), U.S. Pat. No. 5,147,539 (Hagen et al.), U.S. Pat. No. 5,207,915 (Hagen et al.), and U.S. Pat. No. 5,238,621 (Hagen et al.). A particularly preferred SPE medium consists of C18 bonded silica beads (approximately 5–6 wt-%, based on the total weight of the beads), which sorb hydrocarbon compounds from water, and glass beads having a mean volume particle size of about 70 microns (approximately 94–95 wt-%, based on the total weight of the beads), which aid in rapid flow-rates, enmeshed within PTFE (approximately 1–2 wt-%, based on the total weight of the SPE medium).

The PTFE matrix can be prepared according to the procedure described in U.S. Pat. No. 4,906,378 (Hagen et al.). Briefly, this involves the steps of blending the particulate material with a polytetrafluoroethylene aqueous dispersion in the presence of sufficient lubricant water to exceed the absorptive capacity of the solids, yet maintain a putty-like consistency, subjecting the putty-like mass to intensive mixing at a temperature of about 50° C. to about 100° C. to cause initial fibrillation of the polytetrafluoroethylene particles, biaxially calendering the putty-like mass to cause additional fibrillation of the polytetrafluoroethylene particles while maintaining the same water content and drying the resultant sheet.

Optionally, the SPE layer can include multiple layers suitable material. In such cases, preferably, a third porous support layer is disposed between layers of SPE medium.

Other SPE products that can be used in the present invention. Such products are available from Whatman, Inc. of Clifton, N.J., CPI International of Santa Rosa, Calif., and J. T. Baker, Phillipsburg, N.J. These products typically include silica particles with coatings of covalently bonded aliphatic hydrocarbons. For some of the products, the particles are enmeshed within glass fibers. The latter products may be protected by an outer scrim, which may or may not be used in the constructions of the present invention.

Method of Making a One-Piece Disk Construction

The one-piece multilayer SPE article can be made using a variety of techniques. In one aspect, the outer edges of the two outermost layers, i.e., first and second porous support layers, are thermo-mechanically attached at their edges. This is a particularly difficult procedure, however, when the inner SPE medium includes a PTFE matrix enmeshed with particulate material. Thus, for preferred embodiments of the present invention, a method of construction involves ultrasonically welding the two porous support layers. Preferably, at least a portion of the SPE medium is bound within the attachment site. In this case, the SPE medium can be physically encased or wedged in the weld. Preferably, the thermo-mechanical attachment is formed by ultrasonically welding the support layers and substantially simultaneously cutting the layers into a desired shape and dimension.

Due to the low surface energy of PTFE, it typically resists molten resin flow and therefore has minimal capability for being bonded. This resistance thus prevents the formation of any permanent weld seam. However, by taking advantage of the different material characteristics between the multiple layers, it has been surprisingly found that ultrasonic energy can be applied under pressure through the PTFE layer between an anvil and a horn, thereby removing the barrier responsible for preventing the formation of the weld seam. Furthermore, since the weld seam is highly localized it is possible to encase the PTFE membrane between the two outermost layers without damaging or crushing the internal web, over the usable internal diameter. The result is a one-piece multilayer extraction disk capable of providing good extraction and flow rate performance.

Referring to FIG. 2, in a preferred embodiment, a web or membrane of SPE medium 18, which preferably includes a PTFE matrix 20 loaded with C18 coated particles, is positioned between two porous support layers 12 and 14. Optionally, the PTFE matrix 20 may also include inactive (i.e., nonsorptive) particles such as glass beads. Preferably, porous support layers 12 and 14 are made of a polyolefin material. Webs 12, 14, and 18 are positioned over a cut-and-seal ultrasonic welding anvil 30 of an ultrasonic welder (e.g., Branson 900 series Ultrasonic Welder available from Branson Ultrasonics, Inc. of Danbury Conn.). The air pressure of the welder are typically set at about 50 pounds per square inch (psi) to about 100 psi, preferably about 68 psi to about 70 psi.

The welding anvil 30 converts the layers into a one-piece multilayer format, by a combination and substantially simultaneous plunging and welding operation. This process provides a thermo-mechanical attachment site between the two porous support layers 12 and 14. During the plunge welding operation, a flat, hardened steel ultrasonic horn 32 traverses, firmly pressing the three layers 12, 14, and 18 against a welding surface 34 located on anvil 30. Anvil 30 also has a cutting angle $\alpha$ of no less than about 20°, preferably about 25°. Cutting angle $\alpha$ may not be greater than about 40°, preferably, not greater than about 35°. Welding surface 34 measures no less than about 0.01 centimeter (cm), preferably, no less than about 0.02 cm wide. Additionally, welding surface 34 is no greater than about 0.04 cm, preferably, no greater than about 0.03 cm wide.

Figure 3:
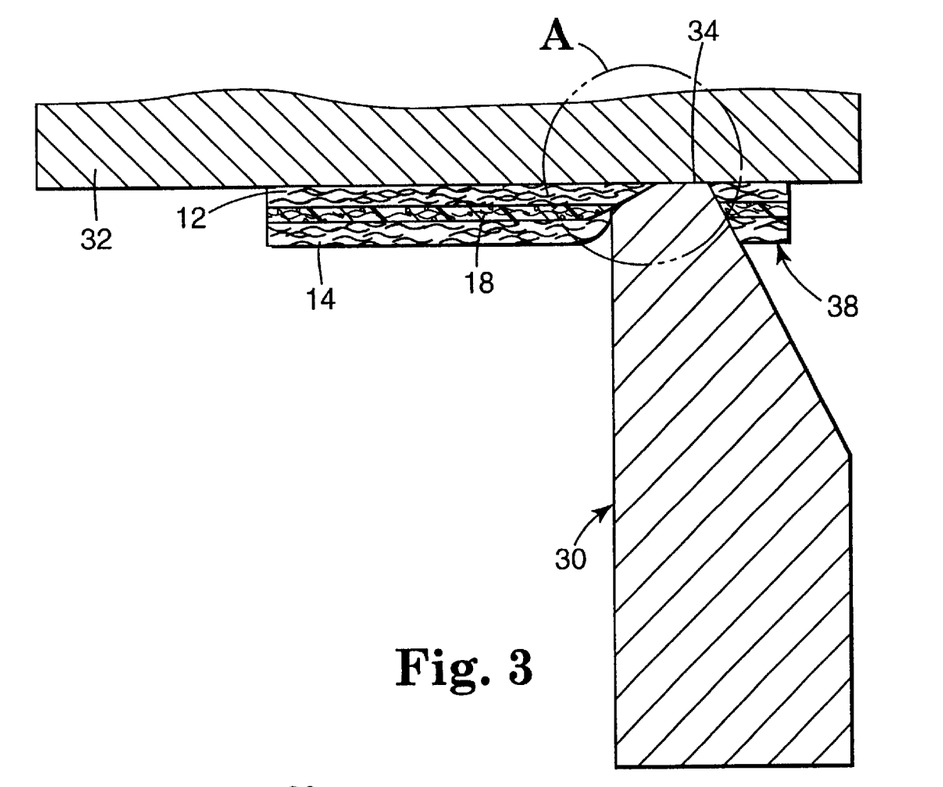
FIG. 3 is cross-sectional view of a portion of an ultrasonic welding apparatus for making a one-piece multilayer extraction article, during welding.
Figure 4:
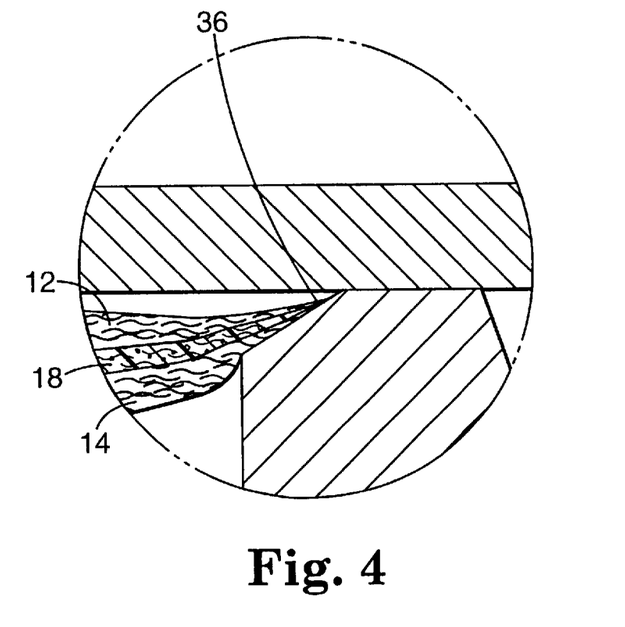
FIG. 4 is an exploded view of section A of FIG. 3.

Referring to FIG. 3, it is shown that the layers 12, 14 and 18 are compressed during a pinching and welding operation. During the pinching operation, ultrasonic energy is applied under pressure. The weld time may be set at a low setting of about 0.5 second, preferably, about 0.9 second. A high setting for the weld time may be 1.5 seconds, preferably, about 1.0 second. The ultrasonic energy from the welder then melts and bonds the two outer nonwoven webs 12 and 14 together such that the molten material forms a localized weld seam 36 about the perimeter of the article. See FIG. 4. A hold time may be set at about 0 second on the low end, and preferably, about 0.15 second. On the upper end of the hold time range, the hold time parameter for the welder may be about 0.25 second, preferably, about 0.17 second. To complete the cutting action, the molten material along the outside circumference of the disk is compressed causing the excess material 38 to flow away from the flat, thereby, resulting in a separation of the sealed article from the surrounding laminate material.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Test Procedures

General Determination of Oil and Grease

Guidelines for determination of oil and grease and total petroleum hydrocarbons by extraction are outlined in EPA (Environmental Protection Agency) Method 1664 ("N-Hexane Extractable Material (HEM) and Silica Gel Treated N-Hexane Extractable Material (SGT-HEM) by Extraction and Gravimetry (Oil and Grease and Total Petroleum Hydrocarbons)") as published by the EPA in April 1995.

SAE Fine Dust Flow Rate Determination Test

The impact of solids content of a sample on the flow rate of the sample aliquot through the SPE disk or SPE disk/pre-filter combination was characterized by challenging the SPE disk, the prefilter, and one-piece SPE articles of the present invention with a known quantity of SAE Fine Dust suspended in water. Suspend solids samples containing 100, 150, and 200±5 mg solids were prepared by suspending SAE (Society of Automotive Engineers) Fine dust (available from Powder Technology Inc., Burnsville, Minn. under the product name ISO12103-1, A2 Fine Test Dust) in one liter of deionized water. Vacuum was applied to the extraction apparatus, the entire contents (one liter) of the challenge suspension introduced into the extraction apparatus reservoir, and the flow time for the complete passage of water through the SPE disk, prefilter and one-piece SPE article for each challenge suspension was recorded.

General Procedures

Preparation of SPE Disk

A PTFE membrane comprising a polytetrafluoroethylene (PTFE) matrix having enmeshed therein C18 bonded silica particles (mean volume particle size=55 microns, supplied by Varian or United Chemical Technologies) and glass beads was prepared substantially as described in U.S. Pat. No. 4,906,378 (Hagen et. al.). The weight of the C 18 coated beads was 4–10 wt-% of the weight of the 70 micron glass beads (supplied by 3M Company under the trade designation TUNGO). The C18 coated particles were added to the glass beads and a PTFE dispersion (supplied by ICI Americas, Inc. under the trade designation FLURON, 1.5–4.0 wt-% based on the combined weight of the bead mixture) was added to the beads. The resulting mixture was manually mixed to produce a dough which was placed on a heated two roll mill and repeatedly calandared to produce a thin film comprising a PTFE matrix containing dispersed glass beads (0.038–0.102 cm thick), which was subsequently cut into 47 and 90 mm diameter disk formats.

The specific composition and properties of the SPE disks used in the present invention is shown in Table 1, although other variations of the components can be made.

TABLE 1

| Varian C18 | 6 wt % |
|---|---|
| PTFE | 2 wt % |
| Thickness | 0.064 cm |
| Mill passes | 8 |
| Durometer | 35 |

Mill passes is the number of times the PTFE dough was passed between the rollers of the two roll mill. Durometer, a hardness measurement, generally fell between 20 and 60.

Ultrasonic Welding Procedure

A Branson Ultrasonic Welder (Model 901AE, available from Branson Ultrasonics, Danbury, Conn.) equipped with a cut-and-seal ultrasonic welding anvil that was configured with a small 0.001 inch to 0.01 inch wide welding flat on its surface was used to prepare the one piece multi-layer solid phase extraction articles of the present invention. A layered construction comprising a SPE membrane positioned between two porous thermoplastic polyolefin cover layers was threaded through a locating collar associated with the anvil, ultrasonic energy applied to the horn, and the horn traversed toward the anvil, thereby pinching the layered construction together. The middle SPE layer was captured in the bond line of the article as the outer polyolefin the layers were bonded together during the welding operation.

Method of Use of a One-Piece Multilayer Extraction Disk for Oil and Grease Extraction Sample Pretreatment The pH of the sample was adjusted to less than 2.0 with the addition of 6N HCl or $H_2SO_4$. Suspended solids were allow to settle (overnight if necessary) and the liquid portion of the sample decanted from the solids.

Manifold Setup

The filtration manifold was set up according to standard procedures, centering the extraction disk on the base of the filtration apparatus and clamping the reservoir in place on top of the disk using single manifold for 47mm disks (available from 3M Company, St. Paul, Minn.). A vacuum of 20–25 inches Hg (0.68–0.85 bar) was used for disk conditioning and analylate separations.

Disk Conditioning

The SPE disk and reservoir sides were washed with n-hexane (approximately 5–10 mL (sufficient solvent volume to cover the top of the disk) and the hexane drawn through the disk be application of vacuum to the collection flask. The disk was allowed to dry under vacuum for approximately one minute, and then the vacuum was removed.

Methanol (10 ml) was added to the reservoir, vacuum applied to the collection flask and a few drops of methanol drawn through the SPE disk, at which point the vacuum was removed, leaving enough methanol in the reservoir to cover the surface of the disk. The disk allowed to soak in the methanol for 60 seconds to complete the conditioning.

Sample Extraction

The sample was poured or decanted into the reservoir and vacuum was immediately applied to the collection flask, drawing the sample through the SPE disk as quickly as possible. (If suspended solids were present in the sample, care was taken to introduce as much of the liquid component of the sample into the reservoir as possible before introducing the solids component.) In the case where solids were present, the disk was not allowed to become dry before the solids were added. (Care was taken to insure maximum transfer of water from the sample container as possible.) After all the liquid had passed through the SPE disk, the vacuum was maintained for a maximum of 5 minutes to dry the disk.

Sample Elution

The filtration assembly was equipped with a clean glass vial for eluate collection. Hexane (10 mL) was added to the original sample container and the closed container inverted several times to insure all the inner surfaces of the container were washed with hexane. The hexane was transferred from the sample container to the disk using a disposable glass pipette, taking care to wash down the sides of the reservoir prior. A vacuum was carefully applied to the collection flask to pull a few drops of hexane through the disk and then the vacuum was removed. The disk was allowed to soak in hexane remaining in the reservoir for no more than 2 minute, at which time it was slowly drawn through the SPE disk by carefully applying a vacuum to the collection flask. The vacuum was maintained for approximately 2 minutes after all the hexane had passed through the disk to dry the disk. The hexane extraction step was repeated a second time using another aliquot (10 mL) of hexane. The sides of the glass reservoir were then washed with another aliquot (10 mL) of hexane, the hexane drawn through the SPE disk by application of a vacuum, and the disk dried by maintaining the vacuum for approximately 5 minutes after all the hexane had passed through the disk.

The combined eluate and washes were then dried by filtering them over anhydrous sodium sulfate (5 g) maintained in a funnel. The sodium sulfate and associated glassware were each subsequently rinsed with aliquots (5mL) to insure a quantative transfer of eluants.

Gravimetric Analysis

Standard gravimetric techniques were used to determine the oil and grease content of the combined eluant and washes.

Example 1 and Comparative Examples C-1 and C-2

A SPE Disk assembly was prepared utilizing a SPE layer, prepared as described above in "Preparation of SPE Disk," a first porous support layer, Oilsorb™ T-151 BMF, available from 3M Co., St. Paul, Minn. and a second porous support layer CELESTRA™ available from BBA Nonwovens, Simpsonville, S.C. The three layers were consolidated into a one piece SPE disk (47 mm diameter) article using the ultrasonic welding procedure described above, where the SPE Disk was disposed between the two blown microfiber webs. The article was tested substantially according to EPA Method 1664 described above, except the 40 mg solution was replaced with a 10 mg suspension of a 50:50 hexadecane/stearic acid. The results, which are an average of seven samples, are presented in Table 2.

TABLE 2

| Recovery | Stdev. | MDL | ML |
|---|---|---|---|
| 98% | 0.216 | 0.679 | 2.159 |

10 mg/L spikes

The MDL is the Method Detection Limit. This is defined as the minimum concentration of a substance that can be measured and reported with 99% confidence that the analyte concentration is greater than zero (taken from "Report of the Method 1664 Validation Studies", EPA April 1995). The ML value is the level at which an entire analytical system produces a recognizable signal and an acceptable calibration point. It is determined by multiplying the MDL by 3.18 and rounding the resulting value to the number nearest 1, 2 or $5 \times 10^n$, where n is an integer. The value 3.18 is the ratio of the 10 times multiplier used in the ACS limit of quantitation calculation to the student's t multiplier of 3.143 that is used to determine the MDL. Stdev, refers to the standard deviation of the percent recovery.

The BMF prefilter (Comparative Example C-1), an SPE media containing PTFE without the prefilter (Comparative Example C-2), and the one piece article of Example 1 were also tested and compared for recovery as outlined above using the EPA standard hexadecane/stearic acid 50/50 solution. The results are tabulated in Table 3.

TABLE 3

| Example | # of Samples | Percent Recovery |
|---|---|---|
| C-1 | 2 | 27.5 |
| C-2 | 2 | 72.5 |
| Example 1 | >10 | 88–98 |

Comparative Examples C-3 through C-5

The performance of several commercially available SPE mediums was compared to the performance of the one-piece article of Example 1 when exposed to several waste water challenges. Recovery data was determined using the "Method of Use of an SPE Disk" procedure described above. Flow rate data was determined by timing the flow of 1 liter samples of the wastewater challenges through the SPE constructions. Tables 4–7 summarizes the results.

Referring to Tables 5–7. Example "C-3" is a commercially available SPE media that uses a porous glass fiber media to contain the C18 sorbent particles; Example "C-4" is commercially available SPE media cartridge that is pre-assembled in a laminar configuration within a polymer housing—it contains a glass fiber prefilter over approximately 1000 mg of loose C18 sorbent particles supported on a support material that prevents the C18 particles from being released; Example "C-5" is a commercially available disk made of borosilicate fibers containing C18 sorbent particles sandwiched, but not bonded, between two polypropylene nonwoven support.

"SD" is the standard deviation of recovery data. "P" indicates that the filter became unplugged during the analysis procedure. The Standard Industry Classification (SIC) code is an EPA designation describing a type of business activity which generates particular wastewaters. These wastewater samples were effluent discharge water. The data is an average of 5 separate tests for each SIC.

SIC Codes water tested include: 7219—laundry and garment cleaning, 4952—sewage systems, 2911—petroleum, 4173—bus maintenance, 3499—fabricated metal production, 2024—food manufacturing such as ice cream. The recovery upon the typical oil & grease test as outlined above.

TABLE 4

Recovery and Flow Properties of Example 1

| SIC | Flow (min) | Recovery (mg) | SD |
|---|---|---|---|
| 7219 | 43.00 | 38.40 | 5.20 |
| 4952 | 2.80 | 3.49 | 1.39 |
| 2911 | 4.00 | 330.88 | 15.40 |
| 4173 | 8.60 | 35.11 | 5.82 |
| 3499 | 26.60 | 6.78 | 2.24 |
| 2024 | 9.00 | 23.03 | 1.16 |

TABLE 5

Recovery and Flow Properties of Comparative Example C-3

| SIC | Flow (min) | Recovery (mg) | SD |
|---|---|---|---|
| 7219 | 65.80 | 27.38 | 6.85 |
| 4952 | 2.40 | 6.14 | 1.26 |
| 2911 | 2.20 | 299.88 | 33.80 |
| 4173 | 33.20 | 21.27 | 2.39 |
| 3499 | 6.40 | 6.02 | 1.94 |
| 2024 | 2.60 | 3.12 | 1.72 |

TABLE 6

Recovery and Flow Properties of Comparative Example C-4

| SIC | Flow (min) | Recovery (mg) | SD |
|---|---|---|---|
| 7219 | 44.00 | 34.79 | 8.42 |
| 4952 | 4.00 | 0.40 | 0.12 |
| 2911 | 6.00 | 368.21 | 21.76 |
| 4173 | 5.00 | 23.40 | 3.56 |

TABLE 6-continued

Recovery and Flow Properties of Comparative Example C-4

| SIC | Flow (min) | Recovery (mg) | SD |
|---|---|---|---|
| 3499 | 19.00 | 7.38 | 1.94 |
| 2024 | 65.30 | 18.45 | 14.40 |

TABLE 7

Recovery and Flow Properties of Comparative Example C-5

| SIC | Flow (min) | Recovery (mg) | SD |
|---|---|---|---|
| 7219 | P | P | P |
| 4952 | 5.20 | 0.73 | 0.14 |
| 2911 | 67.80 | 251.12 | 18.50 |
| 4173 | 5.00 | 12.86 | 2.99 |
| 3499 | 74.50 | 6.19 | 4.53 |
| 2024 | P | P | P |

Referring to Tables 4–7, it is apparent that the one-piece multilayer extraction disk format efficiently recovered hydrocarbon extractables from all the SIC wastewater challenges. Furthermore, it was found that the one-piece disk did not plug in any challenge. In terms of flow times, referring again to Tables 4–7, the one-piece multilayer extraction disk format provided fast flow times, overall.

Example 3 and Comparative Example C-6

A number of melt blown microfiber webs having a range of fiber diameters and solidities were prepared using a polypropylene resin (available under the trade designation ESCORENE 3505G, available from EXXON Corp.) substantially as described in Wente, Van A., "Superfine Thermoplastic Fibers," *Industrial Engineering Chemistry*, vol. 48, pp 1342–1346. The webs were collected on a single drum collector set at approximately 25 cm from the die tip. Effective fiber diameter as calculated according to the methods set forth in Davies, C.N., "The Separation of Airborne Dust and Particles" *Institution of Mechanical Engineers*, London, proceedings 1B, 1952. Web thickness measurements were made using a 100 grams per 10 square centimeter force on the webs. Solidity of the webs was calculated from weight and thickness measurement of webs using the relationship: solidity equals mass of web divided by polymer density divided by volume of the web.

Several BMF prefilters (Examples 2–4 in Table 8) of varying physical properties were prepared and tested individually without an SPE medium (i.e., solely as a prefilter) for flowtimes using 150 mg/L of SAE fine dust. Additionally, a commercially available BMF prefilter (Comparative Example C-6) was tested. Flow time data indicates the effect that thickness, basis weight, and solidity have on the prefilters' capacity to maintain rapid flow without plugging. Lower flow times indicated better performance. Based on this data, it was concluded that lower solidity, higher basis weights and thicker prefilters provided maximum performance (low flow time).

TABLE 8

Prefilter Performance

| Product | Thickness (mm) | Basis Weight (g/sq meter) | % Solidity | Flowtime (sec) |
|---|---|---|---|---|
| Example 1 Prefilter | 3.5 | 220 | 5.1 | 24 |
| Example 2 | 2.3 | 106.0 | 4.7 | 26 |
| Example 3 | 1.8 | 173.0 | 9.6 | 32 |
| Example 4 | 1.4 | 99.0 | 6.3 | 36 |
| C-6 | 0.3 | 71.5 | 19.5 | 330 |

Various modifications and alterations of this invention will become apparent to those skilled in the art without departing from the scope and spirit of this invention, and it should be understood that this invention is not to be unduly limited to the illustrative embodiments set forth herein. The complete disclosures of all patents, patent documents, and publications cited herein are incorporated by reference as if each were individually incorporated by reference.

Various modifications and alterations of this invention will become apparent to those skilled in the art without departing from the scope and spirit of this invention, and it should be understood that this invention is not to be unduly limited to the illustrative embodiments set forth herein. The complete disclosures of all patents, patent documents, and publications cited herein are incorporated by reference as if each were individually incorporated by reference.

What is claimed is:

1. A one-piece multilayer solid phase extraction article comprising
    a) a first porous support layer,
    b) a second porous support layer attached at least one thermo-mechanical attachment site to said first porous layer, and
    c) a layer of solid phase extraction medium disposed between, and in intimate contact with, the first and second porous support layers such that a portion of the solid phase extraction medium is bound within the thermo-mechanical attachment site.

2. The article in claim 1 wherein at least one of said first and second porous support layers is a thermoplastic material.

3. The article in claim 2 wherein said thermoplastic material comprises a polymer selected from the group consisting of polyolefin, polycarbonate, polyester and polyamide.

4. The article in claim 2 wherein said thermoplastic material comprises a polyolefin selected from the group consisting of polyethylene, polypropylene, ethylene/propylene copolymers and blends thereof.

5. The article in claim 1 wherein said thermo-mechanical attachment site is formed by ultrasonic welding.

6. The article in claim 1 wherein said first porous support layer is a pre-filter having a solidity of no greater than about 20%, a thickness of at least about 0.5 mm, and a basis weight of at least about 70 g/m$^2$.

7. The article of claim 1 wherein said first porous support layer is a non-woven web.

8. The article of claim 7 wherein said nonwoven web comprises thermoplastic microfibers.

9. The article of claim 8 wherein said microfibers are melt blown.

10. The article in claim 9 wherein said melt blown microfibers have a diameter of no less than about 0.1 microns and no greater than about 20 microns.

11. The article in claim 1 wherein said first porous support layer comprises multiple layers of porous material, wherein at least one of said multiple layers of porous material is in intimate contact with said layer of solid phase extraction medium.

12. The article in claim 1 wherein the second porous support layer comprises multiple layers of porous material, wherein at least one of said multiple layers of porous material is in intimate contact with the layer of solid phase extraction medium.

13. The article in claim 1 wherein said solid phase extraction medium comprises a fibril matrix comprising the fluoropolymer with sorptive particles enmeshed therein.

14. The article in claim 13 wherein said sorptive particles comprise silica particles coated with an aliphatic hydrocarbon.

15. The article in claim 13 wherein said solid phase extraction medium further comprises glass particles enmeshed within the fibril matrix.

16. The article in claim 11 which is in the form of a circular disk or a polygon.

17. The article in claim 16 wherein said thermo-mechanical attachment site is at the perimeter.

18. The article in claim 16 wherein the solid phase extraction medium is bound within said thermo-mechanical attachment site at at least one point within the perimeter.

19. The article of claim 1 wherein said first and second porous support layers comprise the same thermoplastic polymeric material.

20. The article of claim 1 wherein the solid phase extraction medium comprises a fluoropolymer.

21. A method of extracting an analyte from a sample comprising
   a) providing a one-piece multilayer solid phase extraction article comprising
      i) a first porous support layer,
      ii) a second porous support layer attached to said first porous support layer at at least one thermo-mechanical attachment site, and
      iii) a layer of solid phase extraction medium disposed between, and in intimate contact with, the first and second porous support layers such that a portion of the solid phase extraction medium is bound within the thermo-mechanical attachment site; and
   b) passing the sample through said one-piece multilayer solid phase extraction article.

22. The method according to claim 21, wherein said first porous support layer is a pre-filter having a solidity of no greater than about 20%, a thickness of at least about 0.5 mm, and a basis weight of at least about 70 g/m$^2$.

23. The method according to claim 21 wherein at least one of said first and second porous support layers comprises a thermoplastic material.

24. A method of thermo-mechanically making a one-piece multilayer extraction article comprising:
   a) stacking a first porous support layer, a second porous support layer, and a layer of solid phase extraction medium therebetween;
   b) positioning said stack of layers in an ultrasonic welder, said welder comprising an anvil and an ultrasonic horn; and
   c) pinching said stack of layers between said anvil and said horn to form at least one thermo-mechanical attachment site between said first and second porous support layers, wherein at least a portion of the solid phase extraction medium is bound within said thermo-mechanical attachment site.

25. The method according to claim 24 wherein said anvil comprises a cutting angle sufficient to cut said stack of layers at substantially the same time as the formation of said thermo-mechanical attachment site.

26. The method according to claim 24 wherein at least one of said first and second porous support layers comprises a thermoplastic material.

27. The method according to claim 26 wherein said thermoplastic material comprises a polymer selected from the group consisting of polyolefin, polycarbonate, polyester and polyamide.

28. The method according to claim 26 wherein said thermoplastic polymeric material comprises a polyolefin selected from the group consisting of polyethylene, polypropylene ethylene/propylene copolymers and blends thereof.

29. The method according to claim 24 wherein said first porous support layer is a pre-filter having a solidity of no greater than about 20% a thickness of at least about 0.5 mm and a basis weight of at least about 70 g/m$^2$.

30. The method according to claim 24 wherein said first porous support layer comprises a non-woven web.

31. The method according to claim 30 wherein said nonwoven web comprises micro fibers.

32. The method according to claim 31 wherein said microfibers are melt blown.

33. The method according to claim 32 wherein said melt blown microfibers have a diameter of no less than about 0.1 microns and no greater than about 20 microns.

34. The method according to claim 24 wherein said first and second porous support layers comprise the same thermoplastic polymeric material.

35. The method according to claim 24 wherein said solid phase extraction medium comprises a fibril matrix comprising the fluoropolymer having sorptive particles enmeshed therein.

36. The method according to claim 35 wherein said sorptive particles comprise silica particles coated with an aliphatic hydrocarbon.

37. The method according to claim 35 wherein said solid phase extraction medium further comprises glass particles enmeshed within the fibril matrix.

38. The method of claim 24 wherein the solid phase extraction medium comprises a fluoropolymer.

\* \* \* \* \*

UNITED STATES PATENT AND TRADEMARK OFFICE
CERTIFICATE OF CORRECTION

PATENT NO.    : 6,492,183 B1  
DATED         : December 10, 2002  
INVENTOR(S)   : Craig A. Perman It is certified that error appears in the above-identified patent and that said Letters Patent is hereby corrected as shown below:

Column 17,  
Line 20, delete "claim 11" and insert in place thereof -- claim 1 --.

Column 18,  
Line 24, delete "polymeric".  
Line 25, delete "polypropylene ethylene/propylene" and insert in place thereof -- polypropylene, ethylene/propylene --.

Signed and Sealed this

Eleventh Day of November, 2003

JAMES E. ROGAN  
*Director of the United States Patent and Trademark Office*